Sept. 19, 1972  J. C. STERNBERG  3,692,483
TITRATION METHOD AND APPARATUS
Filed Feb. 22, 1971
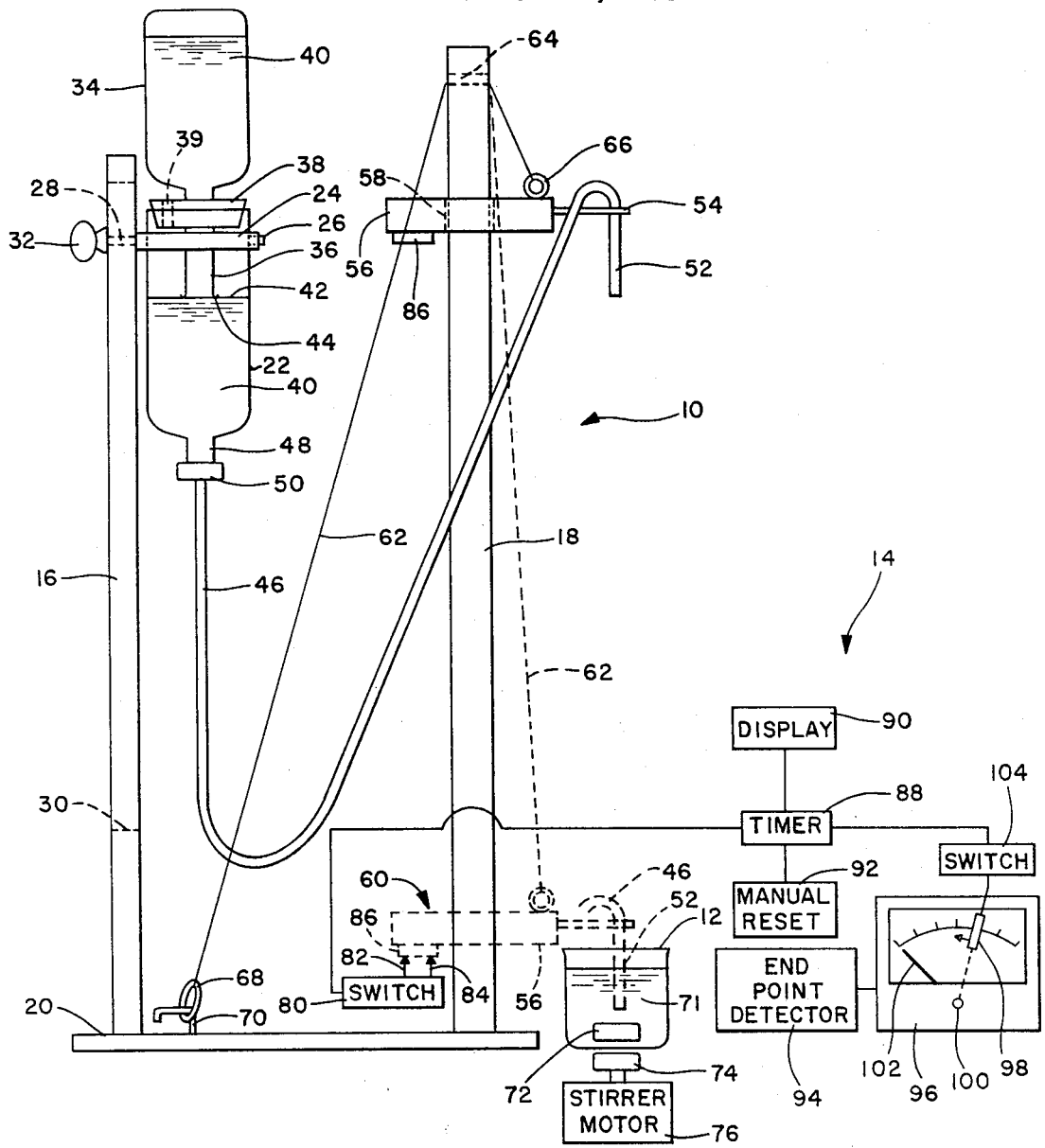
INVENTOR.
JAMES C. STERNBERG 3,692,483
Patented Sept. 19, 1972

3,692,483
TITRATION METHOD AND APPARATUS
James C. Sternberg, Fullerton, Calif., assignor to
Beckman Instruments, Inc.
Filed Feb. 22, 1971, Ser. No. 117,283
Int. Cl. G01n 31/16
U.S. Cl. 23—230 R                    7 Claims

ABSTRACT OF THE DISCLOSURE

A method and apparatus for performing titrations in which a substantially constant hydrostatic head of titrant is maintained in a titrant reservoir. An elongated capillary tube is connected at one end to the reservoir and the other end of the tube, constituting the titrant delivery tip, is normally positioned at least as high as the level of titrant in the reservoir so that no titrant flows through the tube. A sample is delivered to a cell below the titrant delivery tip. The titrant delivery tip is lowered to adjacent the cell whereby titrant will flow by gravity into the cell to commence a titration reaction. Means are provided for detecting the end point of the titration reaction in the cell. The time elapsed between the introduction of titrant into the cell and the time such end point is reached is measured. After the end point has been detected, the titrant delivery tip is raised to the level of titrant in the titrant reservoir to cease further flow of titrant into the sample cell. Since a constant hydrostatic head of titrant is provided, the titrant will flow at a contant known rate into the cell. By knowing the rate of flow of titrant and the time that titrant flows into the sample cell, the titer of the sample may be determined.

BACKGROUND OF THE INVENTION

Field of the invention

The present invention relates to a method and apparatus for making chemical analyses and, more particularly, to a method and apparatus for performing titrations.

Description of the prior art

To effect an automated titration, it is necessary to have means for introducing a titrant at a controlled rate and to measure the amount of titrant introduced between the initiation of its introduction into a sample and an end point of a titration reaction with the sample. Titrant can be introduced incrementally or continuously. The most sophisticated titration systems employ feedback of information on the proximity to the end point to control the frequency or size of increments of titrant delivery or the rate of flow of titrant in continuous addition systems. Even without such feedback, expensive and complex mechanisms are normally involved in providing for the fixed increments or constant rate of introduction of the titrant. The present invention offers a simple and inexpensive method for introducing titrant into a sample, and is ideally suited for performing micro-titrations such as are utilized in clinical chemistry analyses.

SUMMARY OF THE INVENTION

The principal object of the present invention is to provide a simple and inexpensive method and apparatus for performing titrations.

Another object of the invention is to provide a titrator which does not require a pump or valve for delivering titrant to a sample cell.

According to the principal aspect of the present invention, there is provided a method and apparatus for performing titrations in which a substantially constant hydrostatic head of titrant is maintained in a titrant reservoir. An elongated capillary tube is connected at one end of the reservoir and the other end of the tube, constituting the titrant delivery tip, is normally positioned at least as high as the level of titrant in the reservoir so that no titrant flows through the tube. A sample is delivered to a cell below the titrant delivery tip. The titrant delivery tip is lowered to adjacent the cell whereby titrant will flow by gravity into the cell to commence a titration reaction. Means are provided for detecting the end point of the titration reaction in the cell. The time elapsed between the introduction of titrant into the cell and the time such end point is reached is measured. After the end point has been detected, the titrant delivery tip is raised to the level of titrant in the titrant reservoir to cease further flow of titrant into the sample cell. Since a constant hydrostatic head of titrant is provided, the titrant will flow at a constant known rate into the cell. By knowing the rate of flow of titrant and the time that titrant flows into the sample cell, the titer of the sample may be determined. By raising and lowering the delivery tip of the capillary tube between the level of titrant in the reservoir and the sample cell and by using a constant hydrostatic head of titrant in accordance with the present invention, the need for a valve and pump for delivering titrant to the sample cell is eliminated.

BRIEF DESCRIPTION OF THE DRAWING

The drawing illustrates a diagrammatic representation of a titrator apparatus constructed in accordance with the present invention.

DESCRIPTION OF THE PREFERRED EMBODIMENTS

In accordance with the method of the present invention, there is provided means for delivering a substantially constant rate of titrant to a sample cell. This is achieved by providing a titrant reservoir for holding a substantially constant hydrostatic head of titrant therein over a predetermined period for conducting titrations. For example, the constant hydrostatic head may be achieved by utilizing a relatively large reservoir. With the relatively low flow rate of titrant which is employed in micro-titrations, the level of titrant in the reservoir over a period of several hours, for example, will diminish only slightly so that the flow rate of titrant out of the reservoir will remain substantially constant over such period. Alternatively, a "chicken feeder" type of constant head device may be utilized in cooperation with the titrant reservoir to assure that the hydrostatic head of titrant will be maintained constant for a greater period of time. In order to deliver titrant from the reservoir to the cell, there is provided an elongated capillary tube which is connected at one end to the titrant reservoir and its other end, which constitutes the titrant delivery tip, is normally positioned at the same level as or above the level of titrant in the reservoir so that no titrant will flow through the tube. Preferably, the capillary tube has a sufficiently large inner diameter to avoid plugging or variation of flow therethrough by particles or fibers in the titrant. However, the length of the tube is chosen so as to provide a sufficient restriction in flow of titrant from the reservoir so that a relatively low flow rate of titrant through the tube will be achieved.

To perform a titration in accordance with the present invention, the delivery tip of the capillary tube is rapidly lowered to a position above the sample cell which contains a known amount of the sample species, or of another species undergoing a known reaction with the titrant. A timer or stop watch is started as the delivery tip is lowered and the timer or watch is stopped either manually or automatically when the end point of titration is reached. The end point of titration may be determined by a spectrophotometer, fluorometer, colorimeter, nephelometer, as well as by electrochemical devices. The time elapsed between the commencing of flow of titrant into the sample cell and the time that the end point of titration is reached provides a measure of the titer of the sample, and can be evaluated in absolute units through comparison of the time measured for a sample with the time for a calibration standard. The titration end point detection may be based upon a sensor signal reaching a preset level, or a derivative or even second derivative of the signal, or by peak-picking circuitry, which could trigger an electronic switch to automatically stop the timer device.

By the technique of employing a constant head of titrant and the raising and lowering of the delivery tip of the capillary tube connected to the titrant reservoir as described above, the need for a pump to deliver titrant and a valve for controlling the flow of titrant to a sample cell is eliminated. The use of time readout to perform the titration eliminates the need for reading a liquid meniscus to determine the volume of titrant delivered. Calibration of the method is simply accomplished by using standard samples so that it is unnecessary to know precisely the titer of the titrant. The titrant reservoir may be mounted for vertical adjustment so that the titrant head may be readily adjusted to a desired level to provide a predetermined flow rate of titrant. Thus, it is possible to provide a convenient round-number readout on sample concentration without preparing a titrant of closely specified titer. Long term stability of titrant concentration is also relatively less important for the above reasons. From the foregoing, it can be appreciated that the present invention provides a highly inexpensive and readily calibratible means for the performance of titrations.

Referring now to the drawing in detail, there is illustrated a titrator constructed in accordance with the present invention including a titrant delivery assembly 10, sample cell 12 and end point detection and readout system 14. The assembly 10 includes a vertical support 16 and a vertical cylindrical rod 18 both attached to a base 20. A titrant reservoir 22 is fixedly retained in a support ring 24 by a set screw 26. The ring 24 is formed with a threaded arm 28 which extends horizontally through a vertically extending slot 30 formed in the support 16. A wing nut 32 is secured to the threaded arm 28 and serves to adjustably mount the support ring 24 on the support 16. An inverted vessel 34 having a downwardly depending neck 36 is mounted in the titrant reservoir 22 by a rubber stopper 38 having a vent opening 39 therein, thereby providing a "chicken feeder" type of constant head device which will maintain titrant 40 in the reservoir 22 at a constant level 42 corresponding to the level of the bottom 44 of neck 36.

An elongated flexible capillary tube 46 is connected at one end to the bottom 48 of the titrant reservoir by means of a suitable closure 50. The tube extends downwardly from the reservoir, then upwardly over an arm 54 extending outwardly from a block 56 near the top of rod 18, and the end 52 of the tube extends downwardly through an opening in the arm so as to be fixedly secured thereto. A vertical opening 58 in the block 56 slidably receives the rod 18. The end 52 of tube 46 provides a titrant delivery tip which will be positioned immediately over the sample cell 12 when the block 56 is lowered to the dotted line position indicated at 60. A string 62 passing through a passage 64 adjacent the upper end of the rod 18 is tied at one end to an eyelet 66 fixed to the block 56 and its other end is tied to a ring 68. The length of the string 62 is such that when the ring 68 is positioned over a hook 70 fixed to the base 20 the delivery tip 52 of the titrant delivery tube 46 will be level with the level 42 of titrant 40 in the reservoir 22. In such position of the delivery tip 52, no titrant will flow from the reservoir 22 through the tube 46. However, when the ring 68 is removed from the hook 70, the block 56 will drop by gravity to the position shown at 60 wherein the delivery tip 52 is located to deliver titrant, which flows by gravity from the reservoir 22, into sample 71 in the cell 12. Preferably, the delivery tip 52 is sufficiently long so that it will extend below the surface of the solution in cell 12 to provide smooth rather than dropwise delivery of the titrant.

In order to mix the titrant and sample in the cell 12, there is provided a plastic coated magnet 72 in the bottom of the cell which is rotated by a second magnet 74 below the cell and fixed to the shaft of a stirrer motor 76.

In order to demonstrate the method of the present invention, a titrant delivery assembly similar to assembly 10 described above was constructed employing as the tube 46 a five foot long piece of No. 22 needle gauge plastic tubing having an inner diameter of 0.013 inch [0.33 mm.]. The titrant reservoir 22 was approximately 2 cm. in internal diameter and 6 cm. long. The vessel 34 was a short-necked 50 milliliter volumetric flask. A sample of 100 microliters of 1.0 N sodium hydroxide was titrated with 6.0 N hydrochloric acid titrant. The sodium hydroxide was introduced into approximately 3 ml. of distilled water in the sample cell 12 which contained a pH combination glass-reference electrode connected to a conventional pH meter. The reservoir 22 was positioned so as to provide a titrant head of approximately 8 inches. The delivery tip 52 of the capillary tube was lowered to the sample cup to commence titrant flowing thereinto. A stop watch was started at about the mid point of downward travel of the delivery tip. The stop watch was stopped as the pH meter needle crossed pH 7. The elapsed time periods between the delivery of titrant to the sample cell and the time that an end point of pH 7 was reached for ten analyses appear in the table below.

TABLE

| Analysis Number: | Time (seconds) | Deviation from mean (seconds) |
|---|---|---|
| 1 | 49.3 | +0.6 |
| 2 | 48.5 | −0.2 |
| 3 | 48.5 | −0.2 |
| 4 | 49.3 | +0.6 |
| 5 | 48.5 | −0.2 |
| 6 | 49.2 | +0.5 |
| 7 | 47.4 | −1.3 |
| 8 | 48.3 | −0.4 |
| 9 | 49.0 | +0.3 |
| 10 | 49.1 | +0.4 |
| Mean | 48.7 | ±0.47 |

As will be seen, the table indicates the mean time interval for titration and also the deviation of the time measurement for each analysis from the mean value. It is seen that the deviation from the mean value of time measurements made by the present invention is less than ±2%, thus establishing that the method is highly repeatable for performing titration procedures.

During the foregoing ten titrations, the titrant flowed at a rate of approximately 22 microliters per minute and titrant consumption for each analysis amounted to about 16.6 microliters. There was no titrant consumption between analyses, except for the little lost during the time between the end point and the return of the delivery tip 52 to its up position on the rod 18. At the aforementioned rate titrant flow, a 50 ml. reservoir of titrant would suffice for about 2500 analyses, so that reagent preparation becomes insignificant. Separate titrator reservoirs may be maintained on a stand-by basis for different titrants or different concentration ranges of the same titrants. Changeover of the assembly 10 to a different titrant would require only about one minute necessary for mounting a different reservoir 22 in the ring 24 and for connecting a different capillary tube 46 to the reservoir and to the arm 54 of block 56.

The end point detection and readout system 14 is provided for automatically determining the time elapsed between the delivery of titrant to the sample cell and the time that end point of the titration reaction is reached. The system 14 includes a switch 80 having fixed contacts 82 and 84 positioned adjacent to the bottom of the rod 18 in such a manner that when the block 56 is in its "down position" as indicated at 60, whereat titrant is delivered from the tip 52 in the cell 12, a conductive element 86 on the bottom of the block will bridge the contacts 82 and 84 to thereby actuate the switch 80. Actuation of the switch enables a timer 88 which may be a clock or an electronic counter. Preferably the timer is a digital counter having a display 90 and a manual reset 92.

An end point detector 94 is positioned adjacent to the cell 12. The output of the detector is connected to a meter 96 having a contact 98 which is adjustable by the knob 100 to a predetermined end point value. When the detector 94 detects the end point of the titration reaction in cell 12, the needle 102 of the meter 96 will engage the contact 98 thereby actuating a switch 104 which will disable the timer 88. Thus, the end point detection and readout system 14 automatically provides the measurement of the time for titration to take place.

The present invention is particularly suited for performing micro-titrations in a clinical laboratory, especially the fluorescent titration of calcium in blood serum. The determination of total calcium in serum is currently considered to be one of the least satisfactory procedures in clinical chemistry. Such instrumental methods as flame photometry and atomic absorption have proven expensive and not entirely satisfactory. Colorimetric and fluorometric procedures are used, but in general require several steps including filtration, rinsing, resuspension, color development and readout; with all these steps, operator time of one-half hour or greater per sample analysis are commonplace. Titration method, particularly the fluoromertic titration with EDTA, using calcein indicator, are applicable directly to serum, but the inconvenience of titration using conventional apparatus and the operator experience needed to judge the end point visually have limited its use. Furthermore, with icteric or hemolyzed samples the end point cannot be detected visually, so that it is necessary to go through the steps of oxalate precipitation, filtration, etc., before titrating the samples. However, by employing the method and apparatus of the present invention using fluorometric end point detection, a precise meter reading of the end point is substituted for a subjective color or light intensity judgment of the location of the end point. In order to adapt the apparatus of the present invention for fluorescence titration of calcium with a EDTA titrant using calcein indicator, the detector 94 will consist of a black light fluorescent tube which illuminates the sample cup 12 through the bottom through a filter which eliminates most of the visible light, and a cadmium sulfide photoconductive cell which monitors the fluororescent light emitted through the side of the sample cup and selected by a filter which sccreens out the exciting light. The filter cup of course will be maintained in a light-tight container having a small opening for entrance of the delivery tip 52 of titrant delivery tube 46. The current passed by the photoconductive cell at a fixed applied voltage is amplified and displayed on the meter during titration. Meter zero is set by closing an optical shutter and electrically adjusting the "zero" control. When sample is introduced into the cell 12, the meter is then set to read 100% by means of an adjustable control, which varies a resistance in series with the meter. The counter is set to zero by means of the manual reset button. The titration is begun by lowering the delivery tip 52 into the cell 12. As described previously, starting the titration automatically starts the counter and the counter stops automatically at the present end point. Preferably an alarm is provided to indicate when the titration is completed whereupon the block 56 may be raised to its "up position" to stop the flow of titrant. Repeatability of better than ±2% has been demonstrated in replicate determinations on calcium employing a fluorometric titration system as just described. As mentioned previously, however, the present invention is applicable to other forms of titrations, including spectrophotometric, colorimetric or nephelometric, as well as electrochemical.

Although I have herein shown and described my invention in what I have conceived to be the most practical preferred embodiments, it is recognized that departures may be made therefrom within the scope of my invention, which is not to be limited to the details disclosed herein but is to be accorded the full scope of the claims so as to embrace any and all equivalent structures and methods.

What is claimed is:

1. A method of performing a titration comprising the steps of:
   providing a titrant reservoir having an elongated capillary tube connected thereto, said tube terminating in a titrant delivery tip normally positioned at least as high as the level of titrant in said reservoir;
   maintaining a substantially constant hydrostatic head of titrant in said reservoir;
   lowering said tip below said level to a sample cell so that titrant will flow from said reservoir through said tube to the sample in said cell to commence a titration reaction;
   determining the time elapsed between delivering of the titrant to said sample cell and the time the end point of said reaction occurs; and
   thereafter raising said tip to at least said level of titrant to prevent further flow of titrant through said tube.

2. An apparatus for performing titrations comprising:
   a reservoir for holding a substantially constant hydrostatic head of titrant;
   a sample analysis cell positioned below the level of titrant in said reservoir;
   an elongated capillary tube having one end connected to said reservoir;
   means for locating the other end of said tube at an upper position at least as high as the level of titrant in said reservoir wherein no titrant will flow through said tube, said other end of said tube being movable to a lower position adjacent to said sample analysis cell wherein titrant will flow by gravity from said reservoir through said tube into said cell;
   means for detecting the end point of a titration reaction in said cell; and
   means for indicating the time elapsed between the instance said other end of said tube is located at said lower position and the time said end point is reached.

3. An apparatus as set forth in claim 2 including:
   means cooperating with said reservoir for maintaining said constant hydrostatic head of titrant in said reservoir.

4. An apparatus as set forth in claim 2 wherein said indicating means comprises:
   timer means;
   switch means responsive to the locating of said other end of said tube at said lower position to enable said timer means; and
   means responsive to the end point detecting means reaching a predetermined end point value to disable said time means.

5. An apparatus as set forth in claim 2 wherein said locating means includes:
   a block carrying said other end of said tube;
   means mounting said block for sliding vertical movement adjacent to said cell;
   means for releasably retaining said block on said mounting means at one position whereat said other end of said tube is located at said upper position; and upon release of said retaining means, said block being movable on said mounting means to a second position whereat said other end of said tube is located at said lower position.

6. An apparatus as set forth in claim 5 wherein:

said mounting means includes a vertically extending rod; and said block has a vertical opening therethrough slidably receiving said rod whereby said block will drop by gravity to said second position upon release of said retaining means.

7. An apparatus as set forth in claim 6 wherein said retaining means comprises:

a string connected at one end to said block;

a passage in said rod adjacent to the upper end thereof;

said string passing through said passage; and means for releasably coupling the other end of said string to a fixed object.

References Cited

UNITED STATES PATENTS 2,604,383    7/1952    Morse _____ 23—253 R

MORRIS O. WOLK, Primary Examiner

R. M. REESE, Assistant Examiner

U.S. Cl. X.R

23—253 R